United States Patent
Oka et al.

[11] Patent Number: 6,123,481
[45] Date of Patent: Sep. 26, 2000

[54] ELASTIC SHAFT JOINT

[75] Inventors: Shoji Oka, Gunma-ken; Sakae Matsumoto, Takasaki, both of Japan

[73] Assignee: NSK Ltd., Tokyo, Japan

[21] Appl. No.: 09/064,320

[22] Filed: Apr. 23, 1998

[30] Foreign Application Priority Data

May 16, 1997 [JP] Japan ..................... 9-127295

[51] Int. Cl.[7] ........................................ F16D 3/12
[52] U.S. Cl. ..................... 403/228; 464/88; 464/162; 403/220; 403/225; 403/372
[58] Field of Search ................. 464/87, 88, 89, 464/92, 134, 135, 162; 413/228, 226, 225, 220, 372, 365, 404, 227

[56] References Cited

U.S. PATENT DOCUMENTS

| | | | |
|---|---|---|---|
| 2,772,547 | 12/1956 | Nolan | 464/162 |
| 3,066,503 | 12/1962 | Flemming et al. | 464/83 |
| 4,183,258 | 1/1980 | Stephan | 464/89 |
| 4,385,897 | 5/1983 | Mallet . | |
| 4,479,786 | 10/1984 | De Bisschop | 464/89 |
| 4,496,332 | 1/1985 | Keller et al. | 464/89 |
| 4,509,775 | 4/1985 | Arndt . | |
| 4,595,383 | 6/1986 | Nienhaus | 464/162 |
| 5,086,661 | 2/1992 | Hancock | 464/89 |
| 5,259,818 | 11/1993 | Kachi et al. | 464/89 |
| 5,503,043 | 4/1996 | Olbrich | 464/89 |
| 5,836,821 | 11/1998 | Yamada et al. | 464/162 |
| 5,902,186 | 5/1999 | Gaukel | 464/162 |
| 5,916,026 | 6/1999 | Sadakata | 464/89 |

FOREIGN PATENT DOCUMENTS

| | | |
|---|---|---|
| 2 464 404 | 3/1981 | France . |
| 2 614 985 | 11/1988 | France . |
| 54-82257 | 6/1979 | Japan . |
| 56-39325 | 4/1981 | Japan . |
| 56-131831 | 10/1981 | Japan . |
| 60-184716 | 9/1985 | Japan . |
| 60-184717 | 9/1985 | Japan . |
| 60-184718 | 9/1985 | Japan . |
| 60-215122 | 10/1985 | Japan . |
| 60-215123 | 10/1985 | Japan . |
| 61-201924 | 9/1986 | Japan . |
| 5-83462 | 11/1993 | Japan . |
| 5-89964 | 12/1993 | Japan . |
| 7-5299 | 2/1995 | Japan . |

*Primary Examiner*—Terry Lee Melius
*Assistant Examiner*—Kenneth Thompson
*Attorney, Agent, or Firm*—Vorys, Sater, Seymour and Pease LLP

[57] ABSTRACT

An elastic shaft joint of the present invention comprises an elastic member, a slide sleeve and a stopper. The elastic member is composed of an elastic material such as rubber, elastomer etc and held on an inner peripheral surface of a cylindrical portion fixedly provided on the cylindrical member. The slide sleeve is made using a low-friction material such as a synthetic resin, an oil-impregnated metal etc, held on an inner peripheral surface of the elastic member and elastically pressed against an outer peripheral surface of the shaft by an elasticity of the elastic member. The stopper is provided between the shaft and the cylindrical member, permits the shaft and the cylindrical member to slightly displace in the axial and rotating directions, and hinders the displacement in the rotating direction beyond a predetermined angle enough to damage the elastic member and the slide sleeve.

20 Claims, 14 Drawing Sheets

ELASTIC SHAFT JOINT

This application claims the benefit of Japanese Application No. 9-127295, which is hereby incorporated by reference.

BACKGROUND OF THE INVENTION

1. Field of the Invention

The present invention relates to an elastic shaft joint incorporated into a universal joint of, e.g., an automobile steering apparatus, and capable of transmitting a motion of a steering wheel to a steering gear and preventing vibrations of the steering gear from being transmitted to the steering wheel.

1. Related Background Art

An automobile steering apparatus is constructed to transmit to a steering gear a motion of a steering shaft rotated by a steering wheel and to give a steering angle to a front wheel. It is usual that the steering shaft and an input shaft of the steering gear cannot be disposed on a straight line. Therefore, the motion of the steering wheel is transmitted to the steering gear by providing a universal joint between the steering shaft and the input shaft. Further, it has hitherto been a practice to provide the universal joint with a vibration absorbing capability in order to prevent a driver from having an uncomfortable feeling when vibrations transferred from the wheels to the steering gear during traveling of an automobile are further transmitted to the steering wheel. The universal joint is thus given the vibration absorbing capability and therefore incorporates an elastic material such as rubber etc, and this elastic material prevents the vibrations from being transmitted.

Known forms of elastic shaft joint or universal joint incorporating an elastic shaft joint are disclosed in Japanese Patent Laid-Open Publication Nos. 56-39325 (=French Patent Laid-Open No. 2464404), 56-131831, 60-184716 through 184718, 60-215122, 60-215123, 61-201924, Japanese Utility Model Laid-Open Publication Nos. 54-82257, 5-83462, 5-89964, French Patent laid-Open No. 2614985 and U.S. Pat. No. 4,509,775. FIGS. 16–18 show the structure disclosed in Japanese Utility Model Publication No. 5-89964.

A universal joint 1 incorporating this elastic shaft joint includes, as illustrated in FIG. 19, a shaft 2, a first yoke 4 externally fitted via a buffer cylinder 3 to a tip (a left end in FIGS. 19 and 20) of this shaft 2, a second yoke 5, and a joint cross 6 for connecting the second yoke 5 to the first yoke 4. A serration shaft member 7 is, as shown in FIGS. 20 and 21, formed at a portion protruding from one end (a left end in FIG. 20) of the buffer cylinder 3 at the tip of the shaft 2. This serration shaft member 7 is in serration-engagement with a central hole 9 of a transmission piece 8. Accordingly, this transmission piece 8 is fixed to the tip of the shaft 2 and rotates together with this shaft 2. Further, protruded pieces 10, 10, protruding more outwards in a diametrical direction than an outer peripheral surface of the buffer cylinder 3, are integrally formed in two positions opposite to each other in the diametrical direction of the outer peripheral edge of this transmission piece 8.

Among the constructive members of the elastic shaft joint 1, the buffer cylinder 3 is formed in a cylindrical shape, including an elastic material 11 such as rubber, elastomer etc. More specifically, this buffer cylinder 3 has an inner sleeve 12 and an outer sleeve 13 each composed of a metal in a cylindrical shape and disposed concentrically with each other. An outer peripheral surface of the inner sleeve 12 and an inner peripheral surface of the elastic material 11 are joined to each other by baking or bonding, and an inner peripheral surface of the outer sleeve 13 and an outer peripheral surface of the elastic material 11 are similarly joined to each other. The inner sleeve 12 is externally fitted to the tip of the shaft 2, while the outer sleeve 13 is internally fitted to a cylindrical member 14 provided in the first yoke 4, which will hereinafter be explained.

The first yoke 4 includes the cylindrical member 14, and a pair of first arms 15, 15 extending in the axial direction from positions, opposite to each other in a diametrical direction, of one end of this cylindrical member 14 in the axial direction (in the right-and-left direction in FIGS. 19 and 20). The tips of (left ends in FIGS. 19 and 20) of these first arms 15, 15 are formed with first circular holes 16, 16 concentric with each other. Further, notches 17, 17 are formed in positions, off the first arms 15, 15 and opposite to each other in the diametrical direction, of one end of the cylindrical member 14 in the axial direction. A width dimension W of each of the notches 17, 17 is larger than a width dimension w (W>w) of each of the protruded portions 10, 10 of the transmission piece 8. Then, in a state where the shaft 2 is assembled inwardly of the first yoke 4, the respective protruded pieces 10, 10 loosely engage with the notches 17, 17 with slight gaps therebetween.

Moreover, the second yoke 5 has a pair of second arms 18, 18 provided at a spacing away from each other, and is fixedly joined to an end of another shaft 19. Tips of the second arms 18, 18 are formed with second circular holes 20 concentric with each other. The four tips of the joint cross 6 are rotatably supported inwardly of the two pairs of first and second circular holes 16, 20 through bearings such as radial needle bearings etc.

The following is an explanation of the operation of the thus constructed elastic shaft joint 1. When the car travels straight forward, or if a rotational torque applied to the shaft 2 from the steering wheel is small, the protruded pieces 10, 10 of the transmission piece 8 fixed to the tip the shaft 2 assume neutral positions inside the notches 7, 17 formed in the cylindrical member 14 of the first yoke 4 or positions slightly biased from these neutral positions. In each of these states, it never happens that the cylindrical member 14 is brought into direct contact with the transmission piece 8. Further, the small rotational torque described above is transmitted from the shaft 2 via the buffer cylinder 3 to the first yoke 4. In this case, vibrations transmitted to the first yoke 4 from the wheel via the steering gear, the other shaft 19, the second yoke 5 and the joint cross 6 etc, are sufficiently absorbed by the elastic material 11 of the buffer cylinder 3 so as not to be transmitted to the shaft 2.

By contrast, if the rotational torque applied from the steering wheel to the shaft 2 is large, as in the case of giving the front wheel a large steering angle, the protruded pieces 10, 10 impinge on the inside surfaces of the notches 17, 17. As a result, a large proportion of the rotational toque applied to the shaft 2 from the steering wheel is transmitted via the transmission piece 8 to the first yoke 4. In this state, the rotational torque transmitted via the buffer cylinder 3 is limited. Accordingly, even if the rotational torque transmitted via the elastic shaft joint 1 increases, no excessive force acts upon the elastic material 11 of the buffer cylinder 3, and this elastic material 11 is not damaged.

In the case of the thus constructed prior art elastic shaft joint, if the vibrations acting in the axial direction are applied to between the shaft 2 and the first yoke 4, a performance of attenuating these vibrations is poor, and the vibrations acting in the axial direction are easily transmitted to the steering wheel. Specifically, if the vibrations in the axial direction are applied to the first yoke 4, a shearing stress is applied in the axial direction to the elastic material 11 provided between the outer peripheral surface of the inner sleeve 12 and the inner peripheral surface of the outer sleeve 13 of the buffer cylinder 3, with the result that this elastic material 11 is elastically deformed. Since a rigidity of the elastic material 11 against the force in this direction is large, the capability of absorbing such vibrations is poor, and the vibrations in the axial direction are, as stated above, easily transmitted to the shaft 2 on the side of the steering wheel from the first yoke 4.

U.S. Pat. No. 4,509,775 discloses a structure capable of absorbing not only the vibrations in the rotating direction but also those in the axial direction. In the case of the structure discussed in this patent, if a large torque is transmitted, it is required that metallic materials be slid on each other in order to ensure the strength, and it is considered difficult to ensure a sufficient durability. Further, to realize a structure with no backlash, it is also required that a minute gap be controlled, and it is considered that the costs might increase for requiring a dimensional accuracy of the parts.

SUMMARY OF THE INVENTION

It is a primary object of the present invention to provide an elastic shaft joint with a practical structure capable of ensuring a sufficient durability and absorbing a large displacement in an axial direction as well as being manufacturable at a comparatively low cost.

The elastic shaft joint of the present invention connects an end portion of a rotatable shaft, such as a steering shaft etc, to a cylindrical member rotating with this shaft, such as a part of a yoke of a universal joint. The correction is made in such a manner as to be capable of absorbing slight displacement in axial and rotating directions.

An elastic shaft joint of the present invention comprises an elastic member, a slide sleeve and a stopper. The elastic member is composed of an elastic material such as rubber, elastomer etc and held on an inner peripheral surface of a cylindrical portion fixedly provided on the cylindrical member. Further, the slide sleeve is made of a low-friction material such as a synthetic resin, an oil-impregnated metal etc, and is held on an inner peripheral surface of the elastic member and elastically pressed against an outer peripheral surface of the shaft by an elasticity of the elastic member. Moreover, the stopper is provided between the shaft and the cylindrical member, permits the shaft and the cylindrical member to slightly displace in the axial and rotating directions, and hinders the displacement in the rotating direction in excess of a predetermined angle enough to damage the elastic member and the slide sleeve.

Incidentally, preferably as the stopper, a non-circular engagement hole, formed in a part of the cylindrical member or a part of the other member fixed to this cylindrical member, loosely engages with an engagement portion the sectional configuration of which is substantially complementary to this engagement hole.

The following is a description of the operation when a rotating force is transmitted while preventing a transmission of vibrations by use of the thus constructed elastic shaft joint according to the present invention. In the case of transmitting a rotating force, if the rotating force to be transmitted has a low torque, the rotating force is transmitted through the elastic member. If the rotating force to be transmitted has, as described above, the low torque, or if no rotating force is transmitted, the elastic member prevents vibrations from being transmitted between the cylindrical member and the shaft. Further, vibrations and displacement in the axial direction are absorbed not only by the elastic member displacing in the axial direction but by the slide sleeve sliding on the outer peripheral surface of the shaft. A friction coefficient between the inner peripheral surface of the slide sleeve and the outer peripheral surface of the shaft can be reduced regardless of an existence of the elastic member. Accordingly, the vibrations and the displacement in the axial direction can be absorbed effectively based on the sliding between the inner peripheral surface of the slide sleeve and the outer peripheral surface of the shaft. Additionally, it is feasible to restrain down to a small level an abrasion between the inner peripheral surface of the slide sleeve and the outer peripheral surface of the shaft, and therefore the durability of the elastic shaft joint can be ensured even in long-term use.

Furthermore, if the torque of the rotating force to be transmitted increases, the rotating force is transmitted between the shaft and the cylindrical member through an engagement of the stopper provided between the shaft and the cylindrical member. Namely, the stopper transmits the rotating force that could not be completely transmitted through the elastic member. Accordingly, it is possible to sufficiently ensure the durability of the elastic member without an excessive stress being applied to the elastic member.

DETAILED DESCRIPTION OF THE PREFERRED EMBODIMENTS

Figure 1:
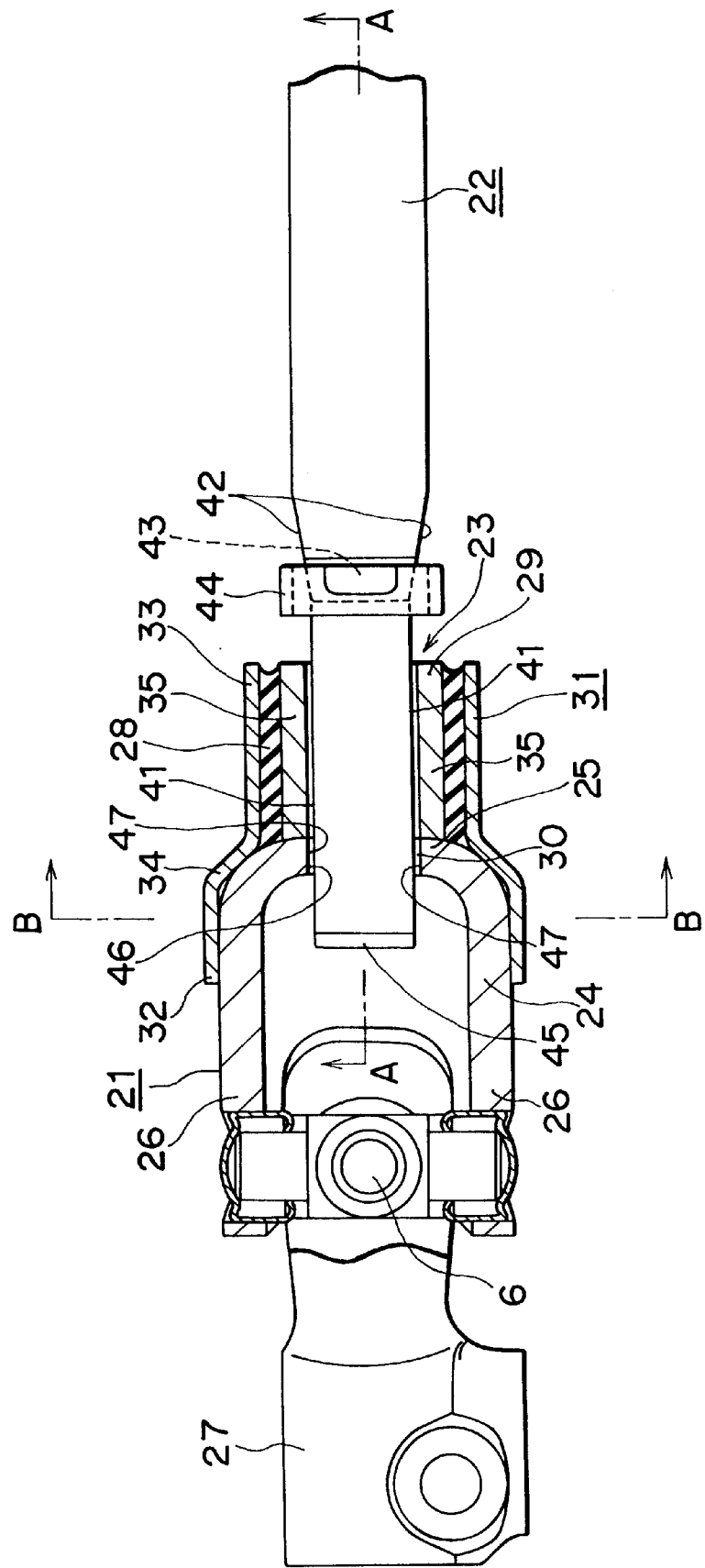
FIG. 1 is a partially cut-off side view showing a first embodiment of the present invention.

FIGS. 1–4 show a first embodiment of the present invention. In accordance with the first embodiment, an elastic shaft joint 23 according to the present invention comprises a yoke 21 of a universal joint for a steering apparatus of a motor car, and a shaft 22 attached to this yoke 21. The yoke 21 is formed by having a steel plate subjected to plastic working such as drawing and to a punching work using a press. The yoke 21 includes a cylindrical member 24, a bottom plate 25 closing a proximal end portion (a right end portion in FIGS. 1 and 2) of this cylindrical member, and arms 26, 26 which are formed by portions remaining after cutting off two positions, opposite to each other in a diametrical direction, of a front end (a left end in FIGS. 1 and 2) of the cylindrical member 24. Another yoke 27 is connected via a joint cross to tips of a pair of these arms 26, 26 so that the yoke 27 is capable of swaying and displacing, thus constituting a Cardan universal joint. The elastic universal joint in this embodiment connects the end of the shaft 22, incorporated into such a universal joint and rotating based on an operation of steering wheel, to the yoke 21 rotating with the rotations of the shaft 22. The connection is designed so as to be capable of absorbing slight displacements caused in an axial direction and in a rotating direction as well.

The above-described elastic shaft joint 23 according to the present invention has an elastic member 28, a slide sleeve 29 and a stopper 30 in addition to the yoke 21 and the shaft 22. The elastic member 28 among these components is fixed to the yoke 21 through a holding cylinder 31. This holding cylinder 31 is constructed in such amanner that a large-diameter portion 32 and a small-diameter portion 33, which are each formed in a cylindrical shape and coaxial with each other, are connected by use of a continuous portion 34 having a conical curved surface. An inside diameter of the large-diameter portion 32 of those portions is in a free state slightly smaller than an outside diameter of the proximal end portion of the cylindrical member 24 of the yoke 21. The thus structured holding cylinder 31 is, with the large-diameter portion 32 being fitted to an outer part of the proximal end of the cylindrical member 24 by a fastening process, thus fixed to the proximal end of the yoke 21 concentrically with this cylindrical member 24 in a state of protruding from the bottom plate 25 on the side opposite to the cylindrical member 24. In the case of this embodiment, the small-diameter portion 33 of the holding cylinder 31 corresponds to a cylindrical portion fixedly provided onto the yoke 21 defined as a cylindrical member 21.

Figure 4:
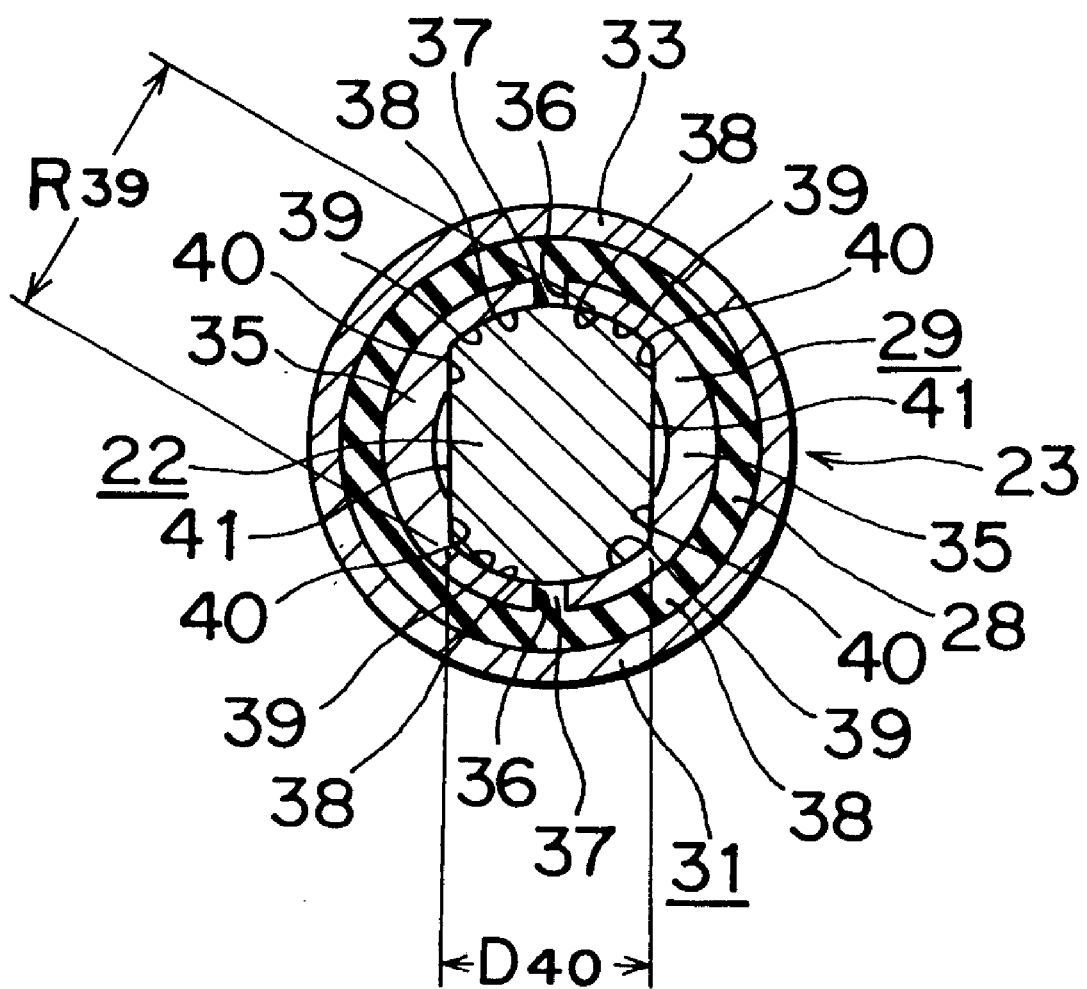
FIG. 4 is a sectional view taken substantially along the line C—C in FIG. 2.

Further, the elastic member 28 is composed of an elastic material such as rubber, elastomer etc, and is fixedly held on an inner peripheral surface of the small-diameter portion 33 by baking and bonding etc in such a state that a positional relationship with this small-diameter portion 33 is not lost. Then, the slide sleeve 29 is fixedly held on an inner peripheral surface of this elastic member 28. This slide sleeve 29 is, as illustrated in FIG. 4, constructed by combining in a cylindrical configuration a pair of sleeve elements 35, 35, each having a substantially circular-arc shape in section (i.e., a semi-cylindrical shape) and in a state where gaps 36, 36 are formed between edges thereof in their circumferential directions. The sleeve elements 35, 35 are each made of synthetic resin such as polyamide resin, poly tetrafluoride ethylene resin, polyacetal resin, or of a low-friction material such as an oil-impregnated metal etc. The sleeve elements 35, 35 are fixedly held onto the inner peripheral surface of the elastic member 28 by a frictional engagement based on the baking and bonding processes or elastic fitting.

Note that protruded strips 37, 37 are formed in two positions opposite to each other in the diametrical direction in the illustrative embodiment, and are engaged with the gaps 36, 36 formed between the circumferential-direction edges of the pair of sleeve elements 35, 35. When the sleeve elements 35, 35 and the elastic member 28 are assembled by bonding or elastic fitting, the protruded strips 37, 37 are formed beforehand, and the positional relationship in the circumferential direction between the elastic member 28 and the slide sleeve 29 is precisely regulated. By contrast, the pair of sleeve elements 35, 35 and the holding cylinder 31 may be concentrically disposed, and the rubber interposed between the peripheral surfaces of these two members 35, 31. Then, the baking is effected by further vulcanizing, in which case these two members 35, 31 are joined through the elastic member 28, and simultaneously the respective protruded 37, 37 are formed. Further, fitting stepped portions 38, 38 are formed respectively in two positions in the circumferential direction on both sides of the inner peripheral surfaces of the sleeve elements 35, 35. Each of these fitting stepped portions 38, 38 is constructed of a circular-arc portion 39 concentric with the outer peripheral surface of each of the sleeve elements 35, 35, and of an inward-flat portion 40 continuous from an inner edge (the edge, closer to the center in the circumferential direction, of each of the sleeve elements 35, 35) of this circular-arc portion 39. The inward-flat portions 40, 40 formed in the fitting stepped portions 38, 38 of each individual sleeve element 35 are disposed on the same plane. Further, in the state where the slide sleeve 29 is constructed by combining the pair of sleeve elements 35, 35, the inward-flat portions 40, 40 existing on the inner peripheral surfaces of the two sleeve elements 35, 35, are parallel to each other.

A pair of outward-flat portions 41, 41 parallel to each other are formed at the tip of the shaft 22. More specifically, the outward-flat portions 41, 41 are formed by cutting flatly two positions, opposite to each other in the diametrical direction in section, of a part of the tip of the shaft 22 taking a round rod-like shape. Proximal edges (right edges in FIGS. 1 and 2) of the outward-flat portions 41, 41 are continuous via inclined surfaces 42, 42 from an outer peripheral surface portion closer to the proximal end of the shaft 22. Moreover, an engagement groove 43 is formed in a portion, matching with the respective inclined surfaces 42, 42 in the axial direction (in the right-and-left direction in FIGS. 1 and 2) but deviating from the inclined surfaces 42, 42 in the circumferential direction on the outer peripheral surface of a middle portion, closer to the tip thereof, of the shaft 22. A stop ring 44 engages with this engagement groove 43. A function of this stop ring 44 will be explained later on.

Given herein is an explanation about a relationship between a sectional dimension of the tip of the shaft 22 formed with the outward-flat portions 41, 41 and a dimension in a free state of the slide sleeve 29 constructed of the pair of sleeve elements 35, 35. Note that the above dimension of the free state of the slide sleeve 29 implies a dimension in a state where the pair of sleeve elements 35, 35 constituting the sleeve 29 displace inwards in the diametrical direction of the small-diameter portion 33 by dint of an elastic force of the elastic member 28 without inserting (press-fitting) the shaft 22 inwardly of the slide sleeve 29. Let $D_{22}$ be the outside diameter of the tip of the shaft 22 and $R_{39}$ be the diameter of a circle defined by the circular-arc portions 39, 39 existing on the inner peripheral surfaces of the pair of sleeve elements 35, 35. In this case, the diameter $R_{39}$ is substantially the same as the outside diameter $D_{22}$ or slightly smaller than this outside diameter ($R_{39} \leq D_{22}$). Further, an interval $D_{41}$ between the outward-flat portions 41, 41 formed at the tip of the shaft 22 is set slightly larger than an interval $D_{40}$ ($D_{41} > D_{40}$) between the inward-flat portions 40, 40 existing on the inner peripheral surfaces of the pair of sleeve elements 35, 35.

The slide sleeve 29 and the tip of the shaft 22, which have the dimensional relationship described above, are combined with each other by displacing the pair of sleeve elements 35, 35 outwards in the diametrical direction of the small-diameter portion 33 while resisting the elastic force of the elastic member 28 and inserting (press-fitting) the tip of the shaft 22 inwardly of the slide sleeve 29. For facilitating this insertion operation, the edge 45 of the tip of the shaft 22 is chamferred. In a state where the slide sleeve 29 and the tip of the shaft 22 are thus combined, the fitting stepped portions 38, 38 on the inner peripheral surfaces of the sleeve elements 35, 35 constituting the slide sleeve 29 are elastically pressed upon the outer peripheral surface of the tip of the shaft 22 by the elasticity of the elastic member 28.

Figure 2:
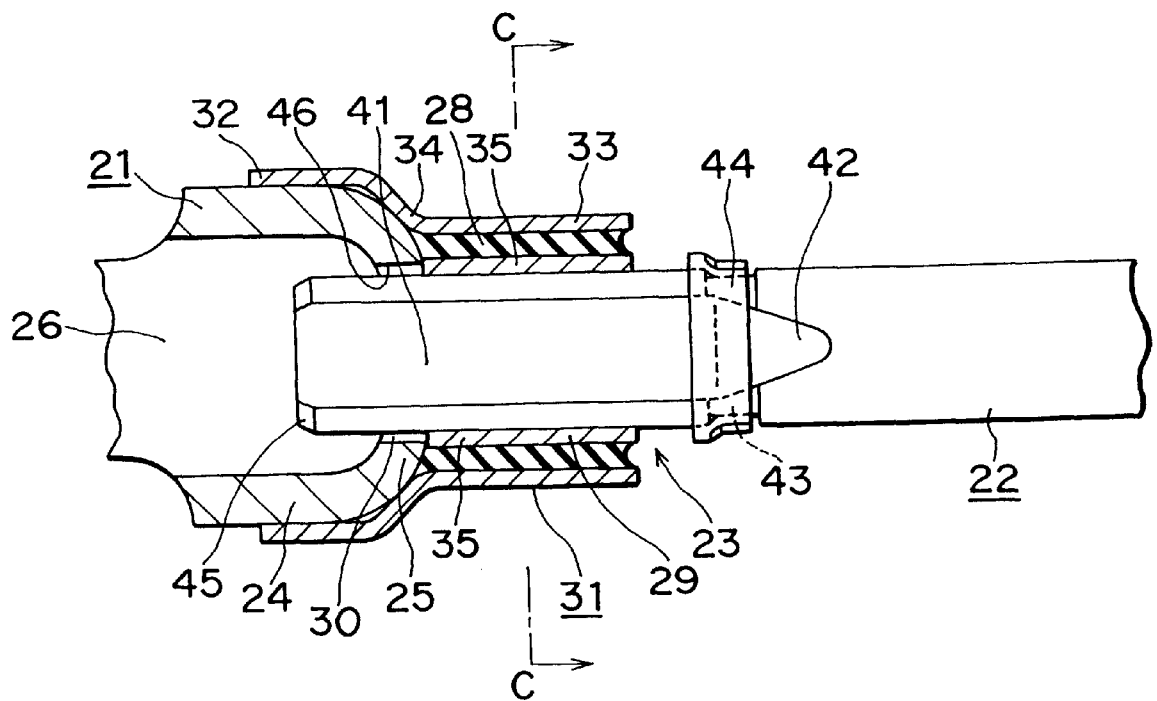
FIG. 2 is a sectional view taken substantially along the line A—A in FIG. 1.
Figure 3:
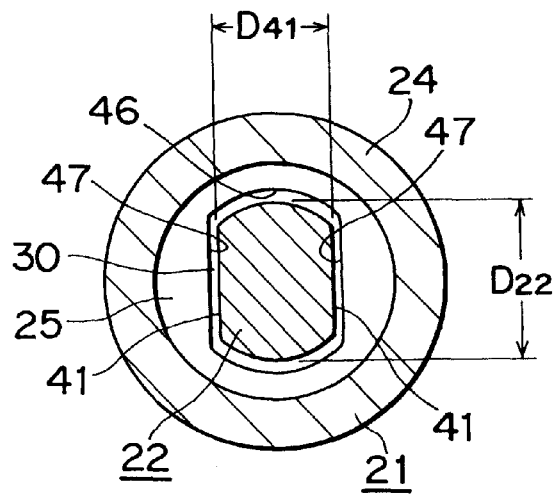
FIG. 3 is a sectional view taken substantially along the line B—B in FIG. 1.

Further, the stopper 30 is provided between the shaft 22 and the yoke 21 and permits slight displacements in the axial and rotating directions of the shaft 22 and of the yoke 21. The stopper 30, however, hinders the displacement through more than a predetermined angle in the rotating direction enough to damage to the elastic member 28 or the slide sleeve 29. In order to constitute the above-described stopper 30, in accordance with the first embodiment, an oval engagement hole 46 is formed in a central part of the bottom plate 25 of the yoke 21. A configuration of this engagement hole 46 is complementary to a sectional configuration of the tip of the shaft 22. A size of the engagement hole 46 is, however, slightly larger than the section configuration of the tip of the shaft 22. Then, in the state where the elastic shaft joint of the present invention is constructed, the tip of the shaft 22 that is defined as the engaging portion is, as illustrated in FIGS. 1–3, loosely inserted into the engagement hole 46.

The following is an explanation of the operation when he thus constructed elastic shaft joint of the present invention transmits the rotating force while preventing a transmission of vibrations. Also, in the case of transmitting the rotating force, if the rotating force to be transmitted has a low torque, the rotating force is transmitted through the elastic member 28. For example, when transmitting the rotating force from the shaft 22 to the yoke 21, the rotations of the shaft 22 are transmitted to the elastic member 28 via the pair of sleeve elements 35, 35 constituting the slide sleeve 29. Then, this elastic member 28 transmits, while being elastically deformed, the rotating force to the yoke 21. As described above, if the rotating force to be transmitted has the low torque, or if no rotating force is transmitted, the elastic member 28 prevents the vibrations from being transmitted between the yoke 21 and the shaft 22. Further, not only the elastic member 28 displaces in the axial direction, but also the slide sleeve 29 slides on the outer peripheral surface of the tip of the shaft 22, whereby the axial vibrations and displacement are absorbed.

A coefficient of friction between the fitting stepped portions 38, 38 provided on the inner peripheral surface of the slide sleeve 29 and the outer peripheral surface of the shaft 22, can be reduced irrespective of the existence of the elastic member 28. Accordingly, the axial vibrations and displacement can be effectively absorbed based on the sliding between the fitting stepped portions 38, 38 and the outer peripheral surface of the tip of the shaft 22. Further, it is feasible to reduce an abrasion down to a small degree between the fitting stepped portions 38, 38 provided on the inner peripheral surface of the slide sleeve 29 and the outer peripheral surface of the shaft 22. Even with use over a long period of time, the durability of the elastic shaft joint can be ensured with the lessened abrasion between the two peripheral surfaces. Note that if the yoke 21 and the shaft 22 tend to largely displace in such a direction as to approach each other, the stop ring 44 impinges upon the proximal edge surface (the right edge surface in FIGS. 1 and 2) of the slide sleeve 29, thus preventing the yoke 21 and the shaft 22 from getting closer to each other. Accordingly, it never happens that the shaft 22 interferes with other parts such as the shaft cross 6 or the other yoke 27 etc of the universal joint.

If the torque of the rotating force to be transmitted increases, the rotating force is transmitted between the shaft 22 and the yoke 21 on the basis of the engagement of the stopper 30 provided between the shaft 22 and the yoke 21. Namely, a part of the outward-flat portions 41, 41 provided at the tip of the shaft 22 impinges on a pair of rectilinear edge portions 47, 47 defining the engagement hole 46 formed in the bottom plate 25 of the yoke 21. Then, the rotating force, which could not be completely transmitted through the elastic member 28, is transmitted between the outward-flat portions 41, 41 and the rectilinear edge portions 47, 47. Hence, the durability of this elastic member can be sufficiently ensured without an excessive stress being applied to the elastic member 28.

Figure 5:
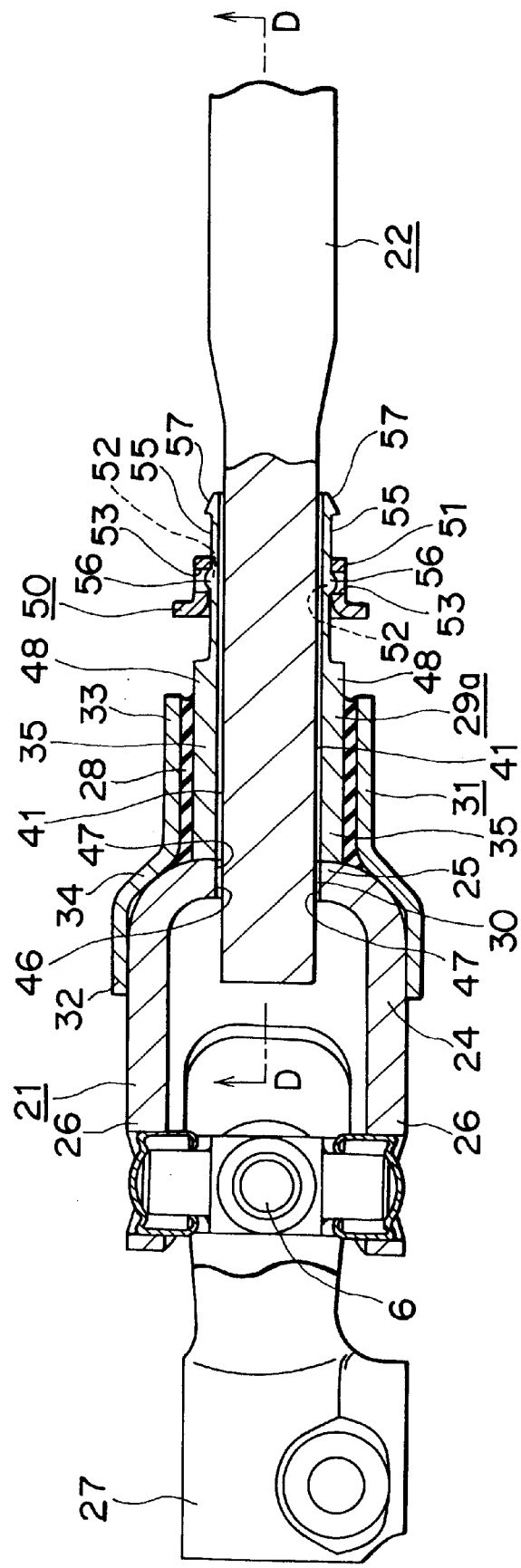
FIG. 5 is a partially cut-off side view showing a second embodiment of the present invention.
Figure 6:
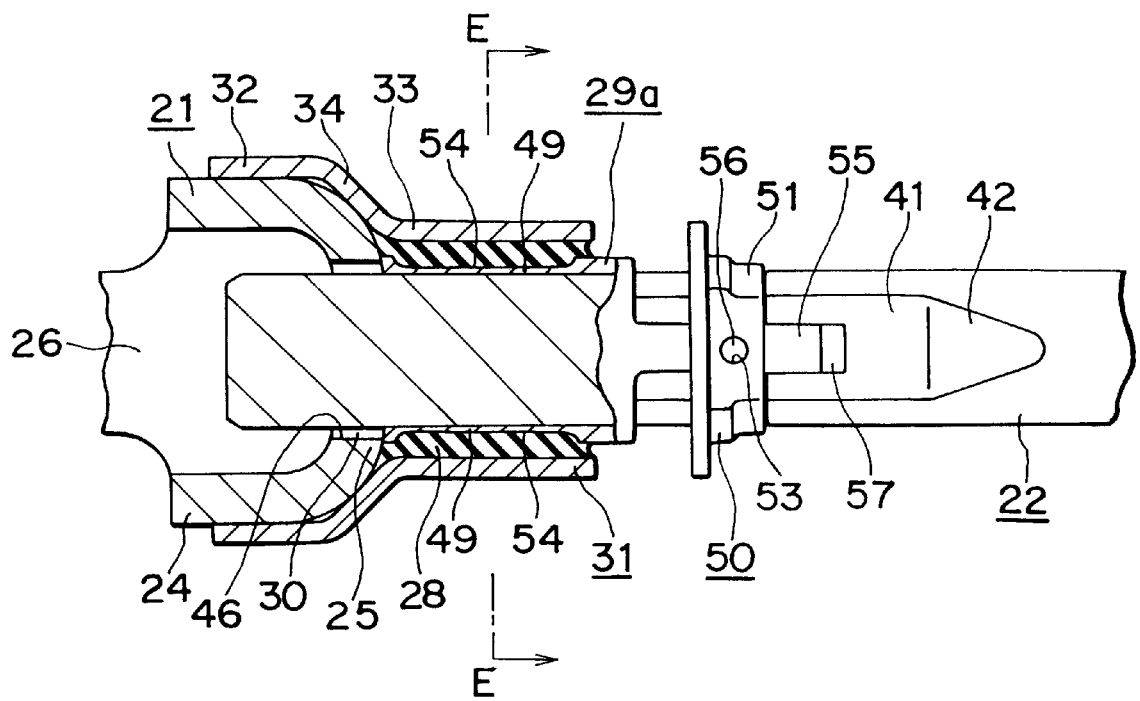
FIG. 6 is a sectional view taken substantially along the line D—D in FIG. 5.
Figure 7:
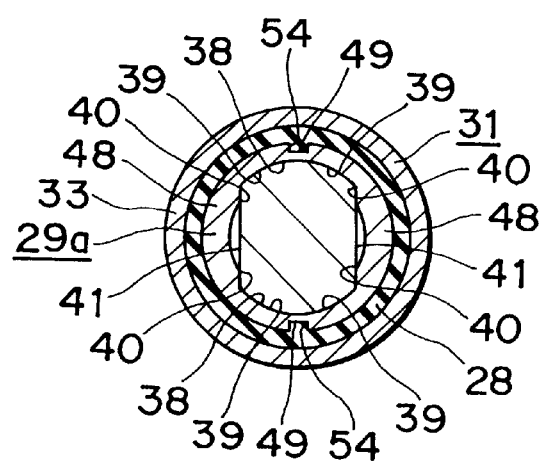
FIG. 7 is sectional view taken substantially along the line E—E in FIG. 6.

FIGS. 5–7 show a second embodiment of the present invention. In the second embodiment, a slide sleeve 29a takes an integral structure, and includes an addition of a structure for positioning the yoke 21 and the shaft 22 in the axial direction when assembled into the a vehicle. Of these structures different from the first embodiment, to start with, the slide sleeve 29a is explained. This slide sleeve 29a is constructed such that circumferential-direction edges of semi-circular arc portions 48, 48, assuming the same configuration as that of each of the sleeve elements 35, 35 (FIG. 4) constituting the slide sleeve 29 in the first embodiment discussed above, are formed in continuation from each other through thin-wall portions 49, 49. These thin-wall portions 49, 49 extend when the tip of the shaft 22 is inserted into the slide sleeve 29a, and thus permit the tip of the shaft 22 to be intserted into the slide sleeve 29a. Note that the respective thin-wall portions 49, 49 are provided in a state of their being biased inwards in the diametrical direction of the slide sleeve 29a, and recessed grooves 54, 54 are formed in two positions, corresponding to the thin-wall portions 49, 49, on the opposite side in the diametrical direction on the outer peripheral surface of the slide sleeve 29a. Corresponding portions of the elastic member 28 engage with the recessed grooves 54, 54, thereby preventing the elastic member 28 and the slide sleeve 29a from deviating in the circumferential direction. Incidentally, when joining the inner peripheral surface of the elastic member 28 to the outer peripheral surface of the slide sleeve 29a by baking, it is the same as the first embodiment discussed above that some of the rubber of the elastic member 28 enters the recessed grooves 54, 54.

Explained next is a structure for positioning the yoke 21 and the shaft 22 in the axial direction when assembled in the vehicle. A positioning ring 50 is fixedly fitted to the outer portion of the tip of the shaft 22. This positioning ring 50 is formed in an annular shape on the whole so as to take a substantially L-shape in section by bending a metal plate. The positioning ring 50 is fixedly fitted to the outer portion of the tip of the shaft 22 in a state of its extending astride the pair of outward-flat portions 41, 41 formed at the tip of the shaft 22. In the state where the positioning ring 50 is thus fitted to the outer portion of the tip of the shaft 22, gaps 52, 52 exist between an inner peripheral surface of a cylindrical member 51 of the positioning ring 50 and the outward-flat portions 41, 41. Further, engagement holes 53, 53 are respectively formed in two positions, facing to the gaps 52, 52, opposite to each other in the diametrical direction, of the cylindrical member 51.

Elastic arm pieces 55, 55 extend from two positions, opposite to each other in the diametrical direction, of the proximal edge (the right edge in FIGS. 5 and 6) of the slide sleeve 29a. Middle parts on outer peripheral surfaces of the elastic arm pieces 55, 55 are formed with engagement protrusions 56, 56, and tips thereof are formed with hooked pieces 57, 57, respectively. When inserting the shaft 22 into the slide sleeve 29a in order to assemble the elastic shaft joint in the second embodiment, the tips of the elastic arm pieces 55, 55 displace inwards in the diametrical direction of the slide sleeve 29a on the basis of the engagement of the inner peripheral edge of the positioning ring 50 with each of the hooked pieces 57, 57, with the result that the elastic arm pieces 55, 55 enter the positioning rings 50, 50. Then, when the shaft 22 continues to be intserted into the slide sleeve 29a, the engagement protrusions 56, 56 formed on the outer peripheral surfaces of the middle parts of the elastic arm pieces 55, 55, engage with the engagement holes 53, 53 formed in the positioning ring 50. Note that the slide sleeve 29a is composed preferably of (not the oil-impregnated metal but) a synthetic resin for attaining the structure in the second embodiment.

A strength of the engagements of the engagement protrusions 56, 56 with the engagement holes 53, 53 is regulated in the manner which follows. To begin with, a minimum value of the engagement strength is so set that the engagement protrusions 56, 56 may not be disengaged from the engagement holes 53, 53 by a force which a worker treating the elastic shaft joint normally applies, and a maximum value of the engagement strength is so set that the slide sleeve 29a smoothly slides on the shaft 22 upon disengaging the engagement protrusions 56, 56 from the engagement holes 53, 53 when a large force acting in the axial direction is applied between the slide sleeve 29a and the shaft 22 with vibrations caused when traveling after the steering apparatus for the automobile has been assembled. Note that the hooked pieces 57, 57 formed at the tips of the outer peripheral surfaces of the elastic arm pieces 55, 55 are provided for restricting the shaft 22 from displacing in an exit direction out of the slide sleeve 29a. These hooked pieces 57, 57 are not necessarily required and may be omitted.

In the second embodiment, the slide sleeve 29a takes the integral structure, thereby facilitating the operation of fixedly holding the slide sleeve 29a inwardly of the elastic member 28. Further, it is feasible to efficiently execute the operation of assembling, into the automobile steering apparatus, the universal joint incorporating the elastic shaft joint of the present invention (as well as to easily perform the operation of regulating the initialized position) by providing the structure for positioning the yoke 21 and the shaft 22 in the axial direction when assembled into the vehicle. Other configurations and operations are the same as those in the first embodiment discussed above, and hence the repetitive explanations are omitted.

Figure 8:
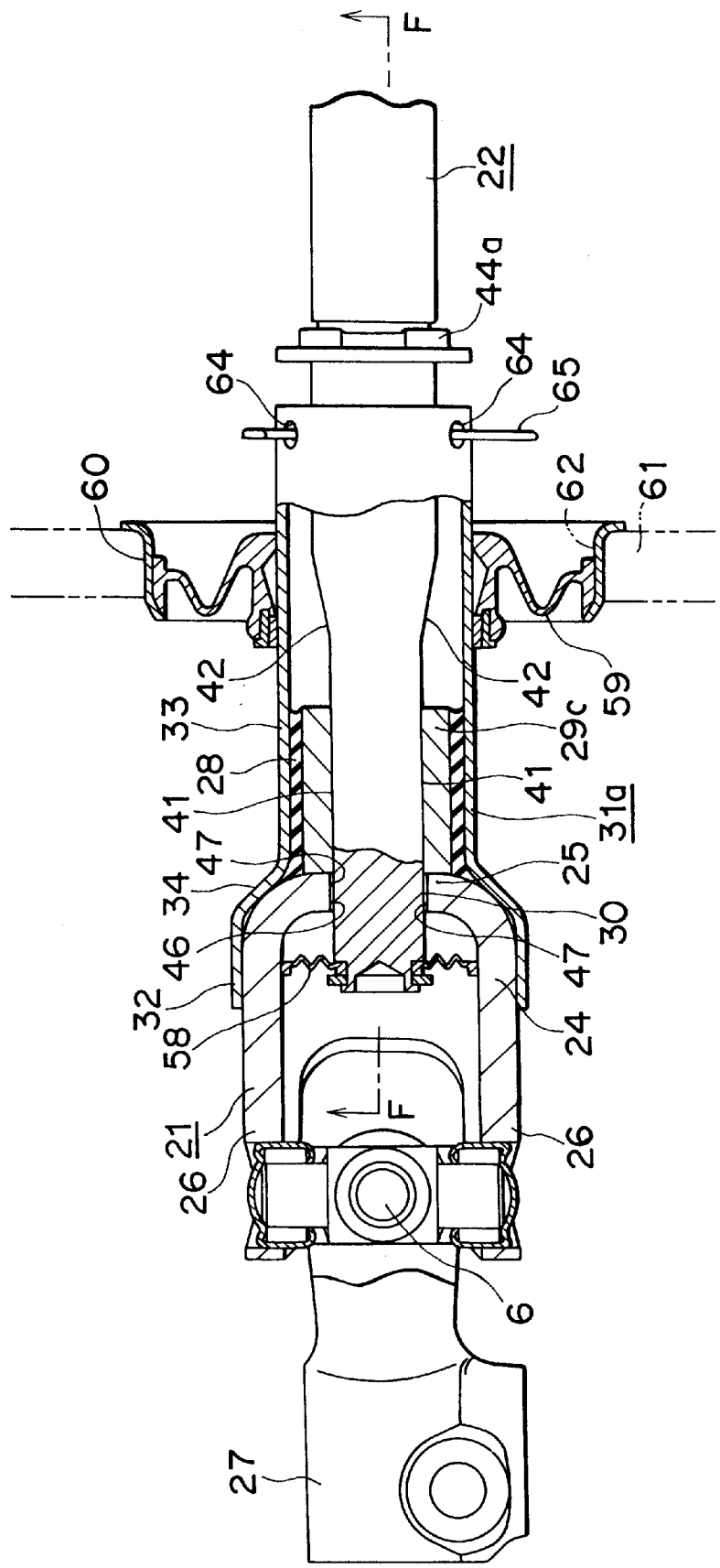
FIG. 8 is a partially cut-off side view showing a third embodiment of the present invention.
Figure 9:
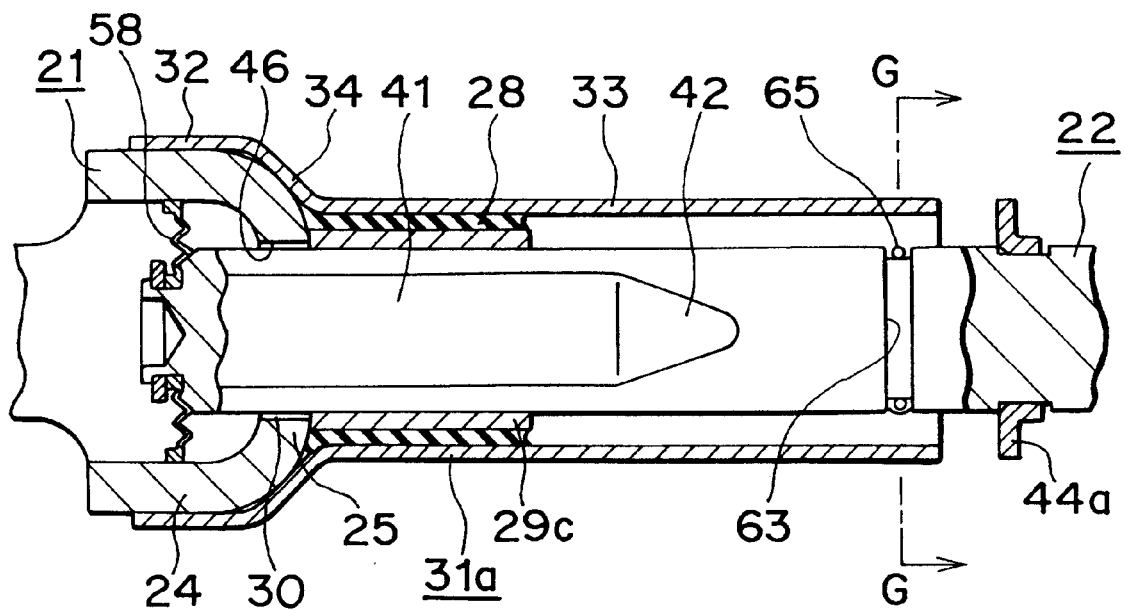
FIG. 9 is a sectional view taken substantially along the line F—F in FIG. 8.
Figure 10:
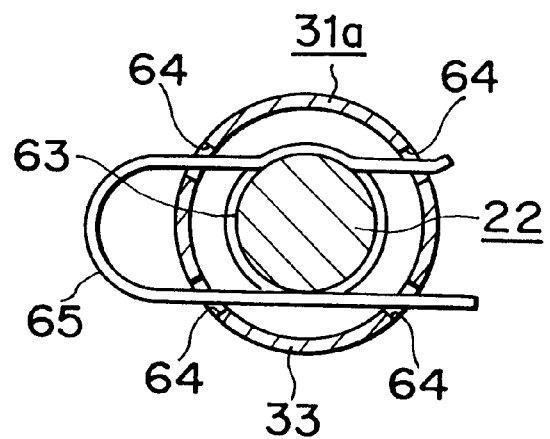
FIG. 10 is a sectional view taken substantially along the line G—G in FIG. 9.

FIGS. 8–10 show a third embodiment of the present invention. Provided in the third embodiment are a seal structure for preventing foreign matters from entering the slide portion between the inner peripheral surface of a slide sleeve 29c and the outer peripheral surface of the tip of the shaft 22, and a positioning structure for positioning the yoke 21 and the shaft 22 in the axial direction, this structure being formed in a middle portion between a holding cylinder 31a and the shaft 22. The seal structure of these characteristic structures in the third embodiment will be at first explained.

A first bellows 58 is provided between a portion of the inner peripheral surface toward the proximal end of the yoke 21 (right end of FIGS. 8 and 9) and an outer peripheral surface of the tip of the shaft 22. This first bellows 58 is made of an elastic material such as rubber, elastomer etc, and has its outer peripheral edge internally fitted to the inner peripheral surface of the yoke 21 and its inner peripheral edge externally fitted to the outer peripheral surface of the tip of the shaft 22, thus closing a gap between the inner peripheral surface of the yoke 21 and the outer peripheral surface of the shaft 22. The gap between the inner peripheral surface of the yoke 21 and the outer peripheral surface of the shaft 22 is closed in this way, thereby preventing the foreign matters such as rain water and dusts etc existing outside the car from entering the slide portion between the inner peripheral surface of the slide sleeve 29c and the outer peripheral surface of the tip of the shaft 22. Note that a rigidity of the first bellows 58 is low, and hence there is almost no possibility in which the first bellows 58 becomes a resistance against a relative displacement of the yoke 21 to the shaft 22.

Further, the holding cylinder 31a for holding the elastic member 28 and the slide sleeve 29c with respect to the yoke 21, extends longer than the elastic member 28 and the slide sleeve 29c beyond the proximal end of the yoke 21. An inner peripheral edge of a second bellows 59 (illustrated in only FIG. 8 but omitted in FIG. 9) engages with an outer peripheral surface of this extended portion. A fixed ring 60 fixed to the outer peripheral edge of the second bellows 59 is fixed inside a through-hole 62 formed in a partition wall 61 for partitioning an engine compartment from the interior of the chamber. Accordingly, a holding cylinder 31a is elastically supported on the internal portion of this through-hole 62, and it never happens that the foreign matters enter the chamber interior via this through-hole 62.

Next, a positioning structure for positioning the yoke 21 and the shaft 22 in the axial direction will be explained. An engagement groove 63 is formed along the entire periphery of the outer peripheral surface of the middle portion of the shaft 22. Further, through-holes 64, 64 are formed in four positions, in the circumferential direction, of the portion matching with the engagement groove 63 at the tip (the right end in FIGS. 8 and 9) of the holding cylinder 31a. Then, a part of an engagement pin 65 structured by bending an elastic linear material in a substantially U-shape, is inserted into the holding cylinder 31a through each of the through-holes 64, 64, and this inserted portion engages with the engagement groove 63. Accordingly, in a state where the engagement pin 65 is inserted through each of the through-holes 64, 64, the yoke 21 and the shaft 22 can be positioned in the axial direction, and it is feasible to implement the operation of assembling, into the automobile steering apparatus, the universal joint incorporating the elastic shaft joint of the present invention. The engagement pin 65 described above is, after a completion of the assembling operation, pulled out of each of the through-holes 64, 64.

Note that in the third embodiment the stop ring 44a engaging with the outer peripheral surface of the middle portion of the shaft 22 is capable of impinging on the front edge (the right edge in FIGS. 8 and 9) of the holding cylinder 31a, thereby restricting the yoke 21 and shaft 22 from displacing so as to approach each other too closely. Other configurations and operations are the same as those in the first embodiment discussed above, and the repetitive explanations are omitted.

Figure 11:
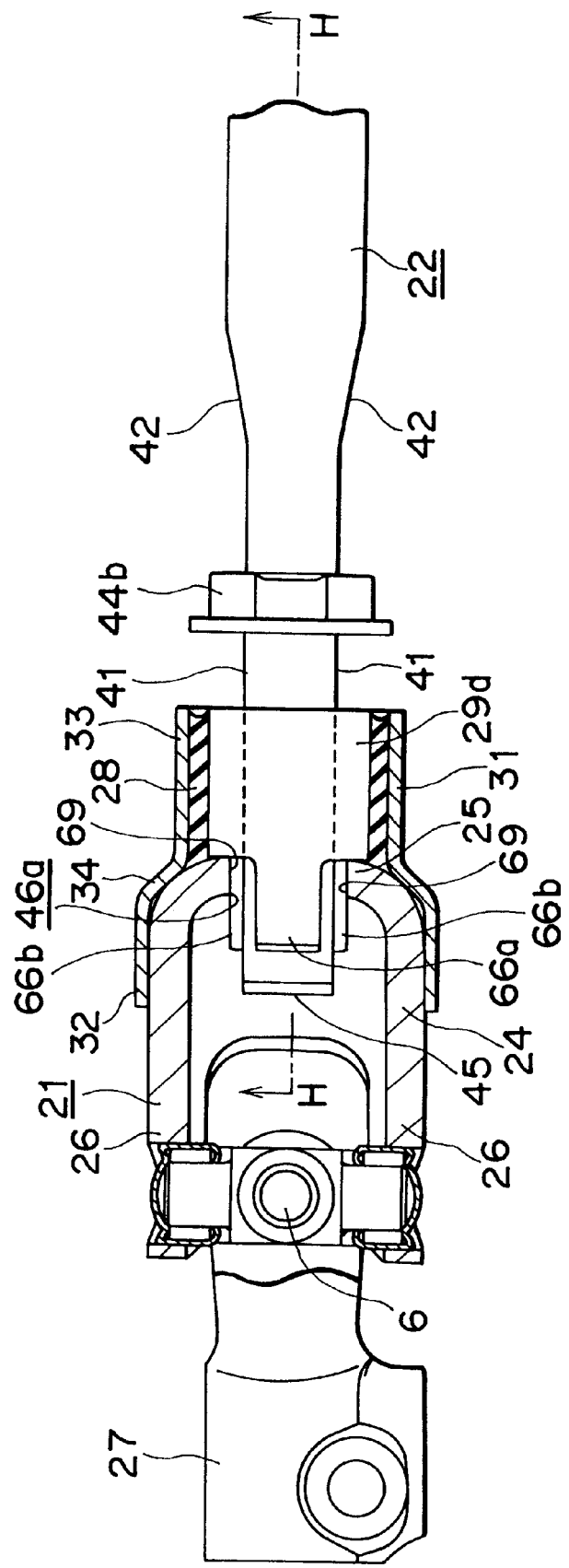
FIG. 11 is a partially cut-off side view showing a fourth embodiment of the present invention.
Figure 12:
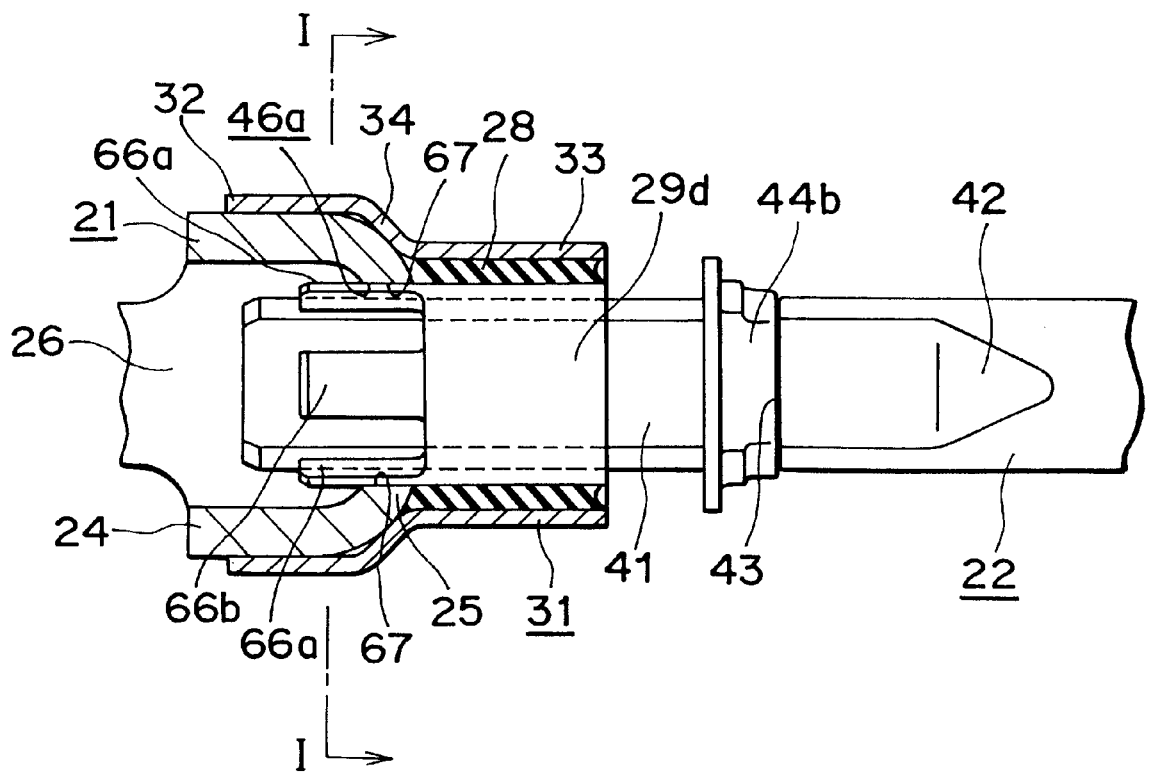
FIG. 12 is a sectional view taken substantially along the line H—H in FIG. 11.
Figure 13:
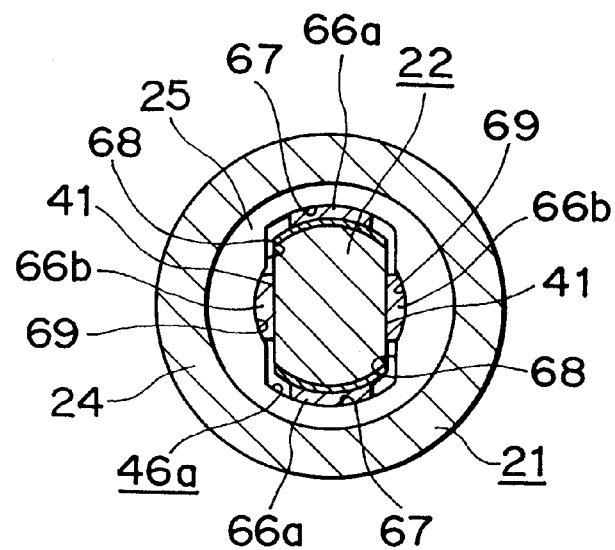
FIG. 13 is a sectional view taken substantially along the line I—I in FIG. 12 with an omission of illustration of a holding cylinder.

FIGS. 11–13 show a fourth embodiment of the present invention. In the fourth embodiment, the yoke and the shaft 22 can be positioned (aligned) at a high accuracy by utilizing a slide sleeve 29d. For this purpose, in the fourth embodiment, protruded pieces 66a, 66b protruding in the axial direction (leftward in FIGS. 11 and 12) from the front edge of the slide sleeve 29d, are provided in four positions of the front edge (the left edge in FIGS. 11 and 12) of this sleeve 29d. Outer peripheral side surfaces of the protruded pieces 66a, 66b are formed as partially cylindrical surfaces the central axis of which is each coaxial with the central axis of the slide sleeve 29d.

Further, a substantially oval engagement hole 46a formed in the central portion of the bottom plate 25 of the yoke 21 includes a pair of first circular-arc portions 67, 67 the central axis of which is each coaxial with the central axis of the yoke 21, and a pair of rectilinear portions 68, 68 parallel to each other, through which to make both ends of the two first circular-arc portions 67, 67 continuous from each other. Moreover, the central portions of these two rectilinear portions are provided with a pair of circular-arc portions 69, 69 the central axes of which are each coaxial with the central axis of the yoke 21. Among the protruded pieces 66a, 66b formed in the four positions of the front edge of the slide sleeve 29d, the protruded pieces 66a, 66b existing in the two positions opposite to each other in the diametrical direction are inserted with no backlash in between the cylindrical surface of the outer peripheral surface of the tip of the shaft 22 and the inner peripheral surfaces of the first circular-arc portions 67, 67, and the remaining protruded pieces 66b, 66b existing in the other two positions are inserted with no backlash in between the outward-flat portions 41, 41 of the outer peripheral surface of the tip of the shaft 22 and inner peripheral surfaces of second circular-arc portions 69, 69.

Thus, each of the protruded pieces 66a, 66b is inserted with no backlash in between the outer peripheral surface of the tip of the shaft 22 and the engagement hole 46a, whereby the yoke 21 and the shaft 22 can be positioned at high precision. The outer peripheral side surface of each of the protruded pieces 66a, 66b is formed as the partially cylindrical surface the central axis of which is coaxial with the central axis of the slide sleeve 29d. Therefore, even when each of the protruded pieces 66a, 66b is inserted with no backlash in between the outer peripheral side surface of the tip of the shaft 22 and the engagement hole 46a, the yoke 21 and the shaft 22 smoothly relatively rotate. Note that in the fourth embodiment the stop ring 44b for restricting the yoke 21 and the shaft 22 from displacing so as to approach each other too closely, is fitted to the middle portion of the area formed with the outward flat portions 41, 41 at the tip of the shaft 22. Other configurations and operations are the same as those in the first embodiment discussed above, and therefore the repetitive explanations are omitted.

Figure 14:
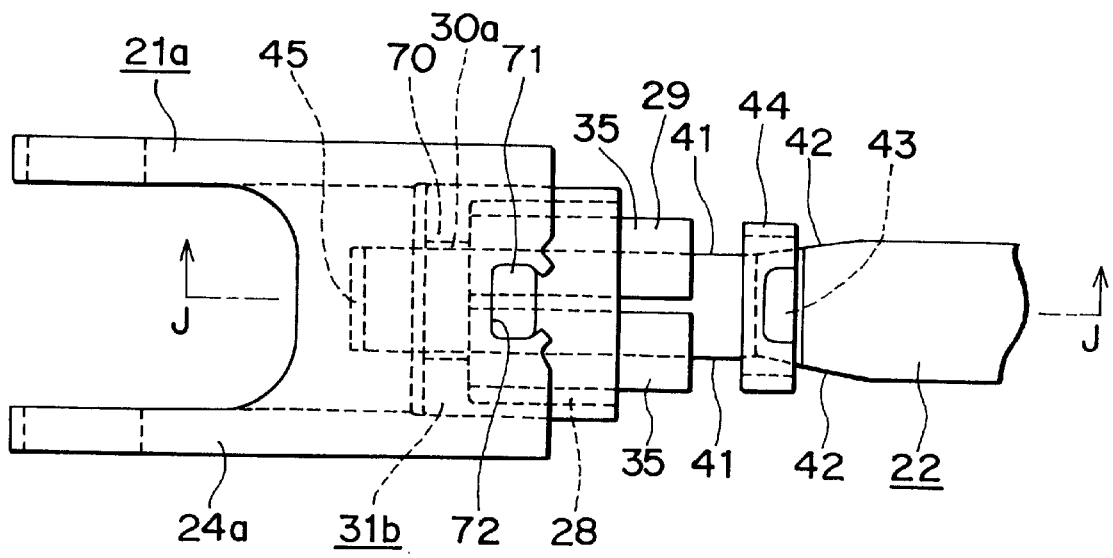
FIG. 14 is a side view showing a fifth embodiment of the present invention.
Figure 15:
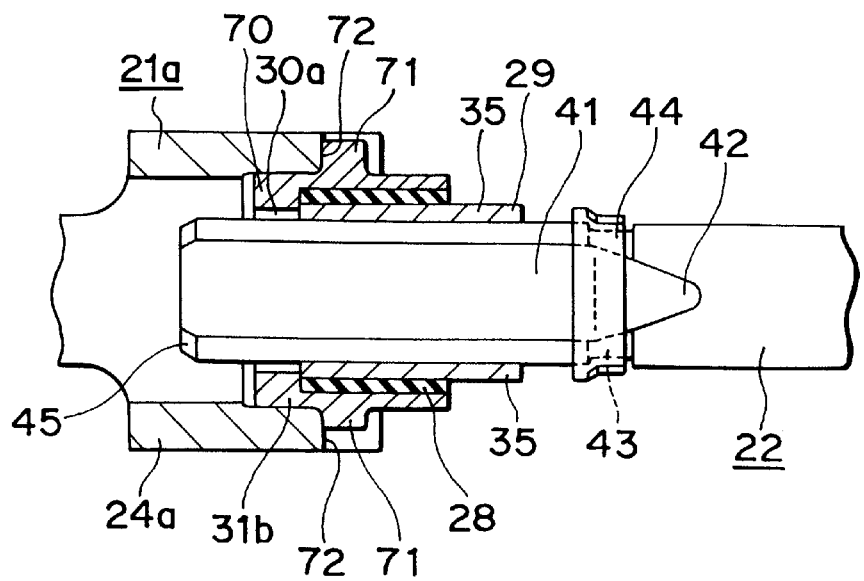
FIG. 15 is a sectional view taken substantially along the line J—J in FIG. 14.

FIGS. 14 and 15 show a fifth embodiment of the present invention. In the fifth embodiment, a holding cylinder 31b is internally fixed to the proximal edge of a cylindrical member 24a of a yoke 21a. The elastic member 28 and the slide sleeve 29 are provided between the inner peripheral surface of this holding cylinder 31b and the outer peripheral surface of the shaft 22, and a stopper 30a is provided between the holding cylinder 31b and the shaft 22. For providing this stopper 30a, an inwardly-hooked portion 70, which is oval in shape of an inner peripheral edge thereof, is formed on the inner peripheral surface of a front end (a left end in FIGS. 14 and 15) of the holding cylinder 31b. Then, the inner peripheral portion of this inwardly-hooked portion 70 engages with the outer peripheral surface of the tip of the shaft 22 so as to be capable of slightly displacing in the circumferential direction and displacing in the axial direction as in the same way with the engaged state (see FIG. 3) of the tip of the shaft 22 with the engagement hole 46 in the first embodiment discussed above.

Further, protruded pieces 71, 71 are formed in a state of protruding in the diametrical direction in two positions opposite to each other in the diametrical direction on the outer peripheral surface of the holding cylinder 31a. Then, these protruded pieces 71, 71 are fitted with no backlash into notches 72, 72 formed in the proximal edge (the right edge in FIGS. 14 and 15) of the yoke 21a, and further openings of these notches 72, 72 are bent by caulking in such a direction as to reduce a width dimension of each of these openings. This construction described above prevents the protruded pieces 71, 72 from disengaging from the notches 72, 72, whereby the holding cylinder 31a is fixedly joined to the yoke 21a in a non-separating manner. Other configurations and operations are the same as those in the first embodiment discussed above, and hence the repetitive explanations are omitted by marking the equal components with the same numerals.

Incidentally, the structure of the stopper is not limited to those shown in the respective embodiments, but a variety of hitherto-known structures may be adopted. For instance, as disclosed in Japanese Patent Application Laid-Open Publication No. 56-131831, the engagement hole assuming a non-circular shape such as an oval shape and a D-shape etc is provided, and the engagement portion taking a shape substantially analogous in sectional configuration to the above engagement hole can be loosely engaged with this engagement hole. Moreover, as in the prior art structures illustrated in FIGS. 16–18, the protruded portions 10, 10 of the transmission piece 8 fixed to the tip of the shaft 2 loosely engage with the notches 17, 17 formed in a part of the cylindrical member 14 constituting the yoke, whereby the stopper can be also structured. In the case of such a structure using the transmission piece 8, it is required that this transmission piece 8 be fixed to the tip of the shaft 2 after the cylindrical member 14 and the shaft 2 have been assembled, which assembling work becomes troublesome to some extent.

Figure 16:
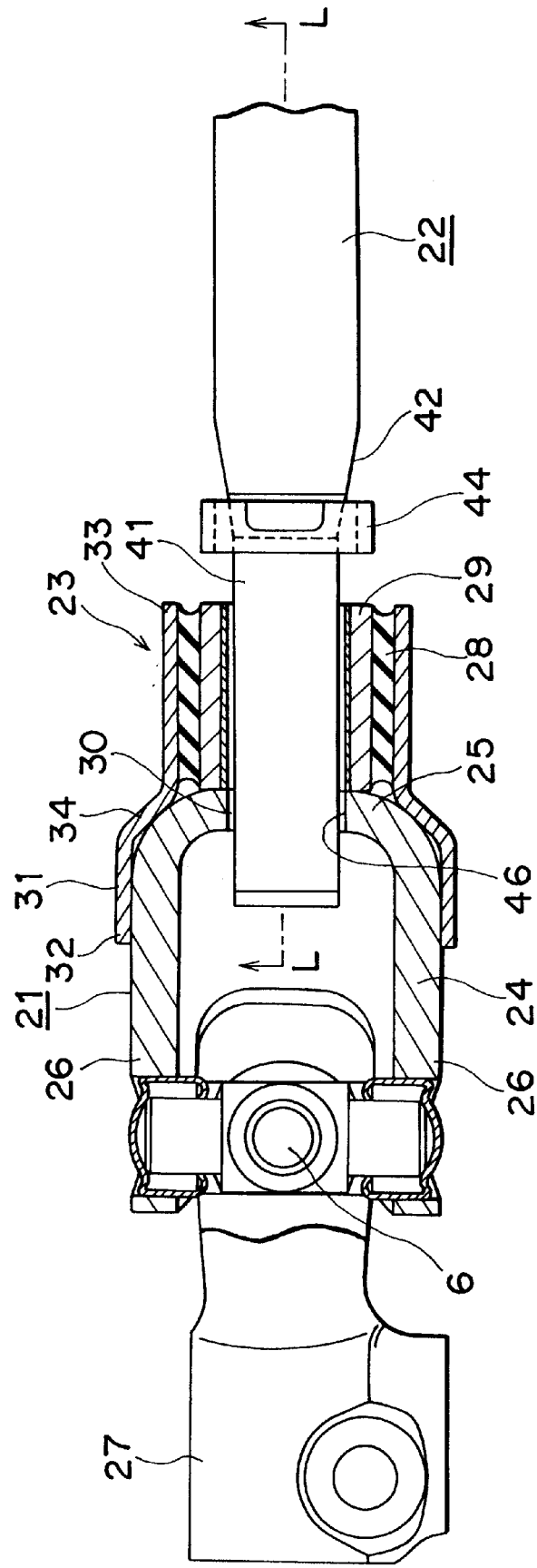
FIG. 16 is a partially cut-off side view showing a sixth embodiment of the present invention.
Figure 17:
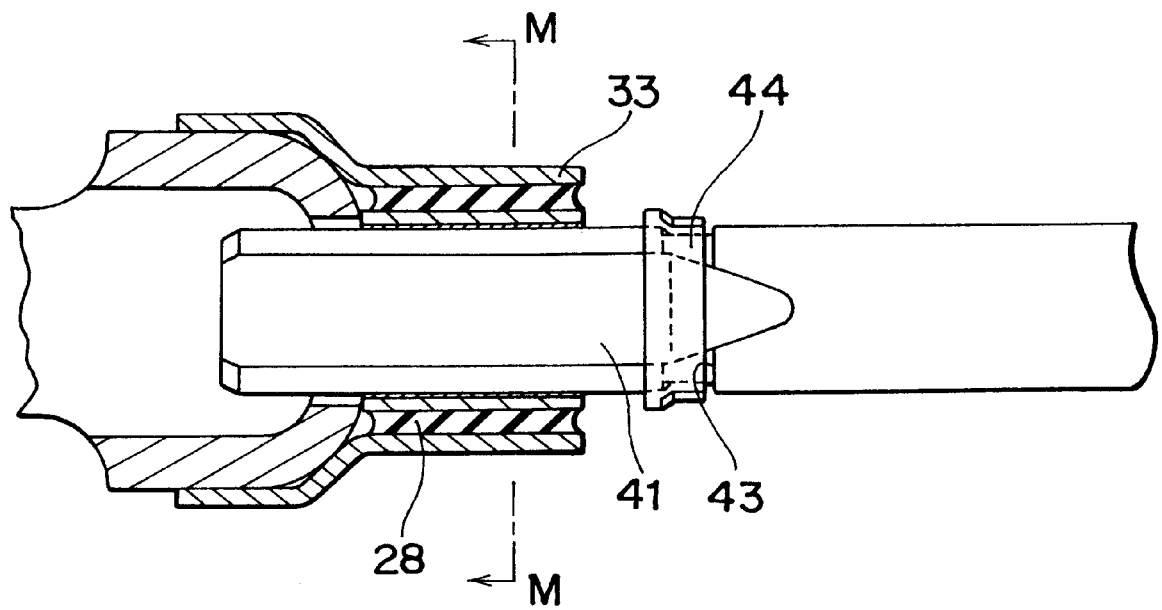
FIG. 17 is a sectional view taken substantially along the line L—L in FIG. 16.
Figure 18:
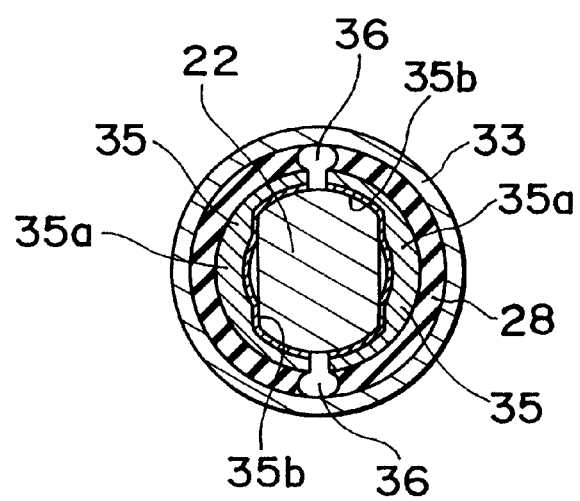
FIG. 18 is a sectional view taken substantially along the line M—M in FIG. 17.
Figure 19:
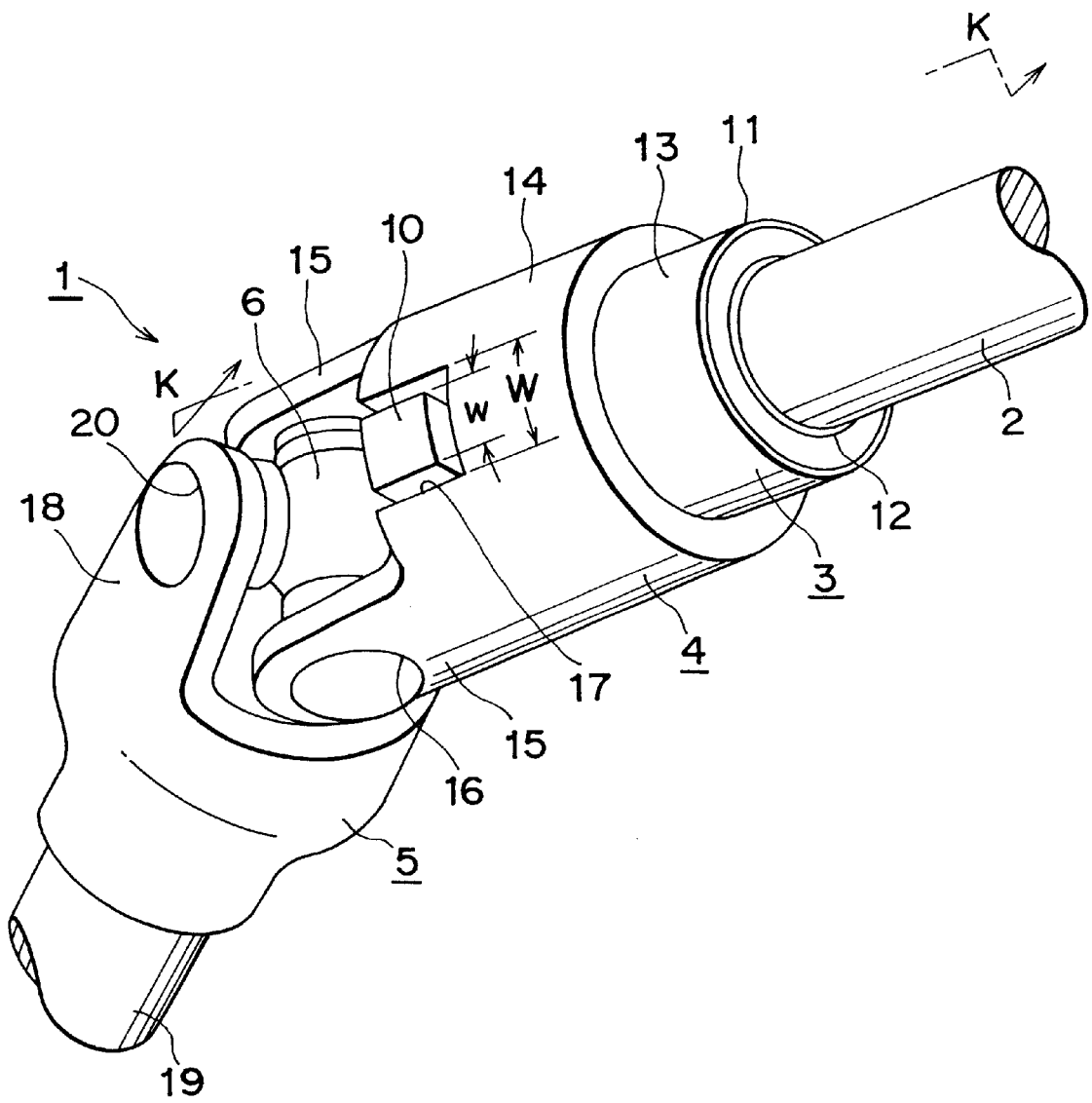
FIG. 19 is a perspective view showing one example of a prior art structure.
Figure 20:
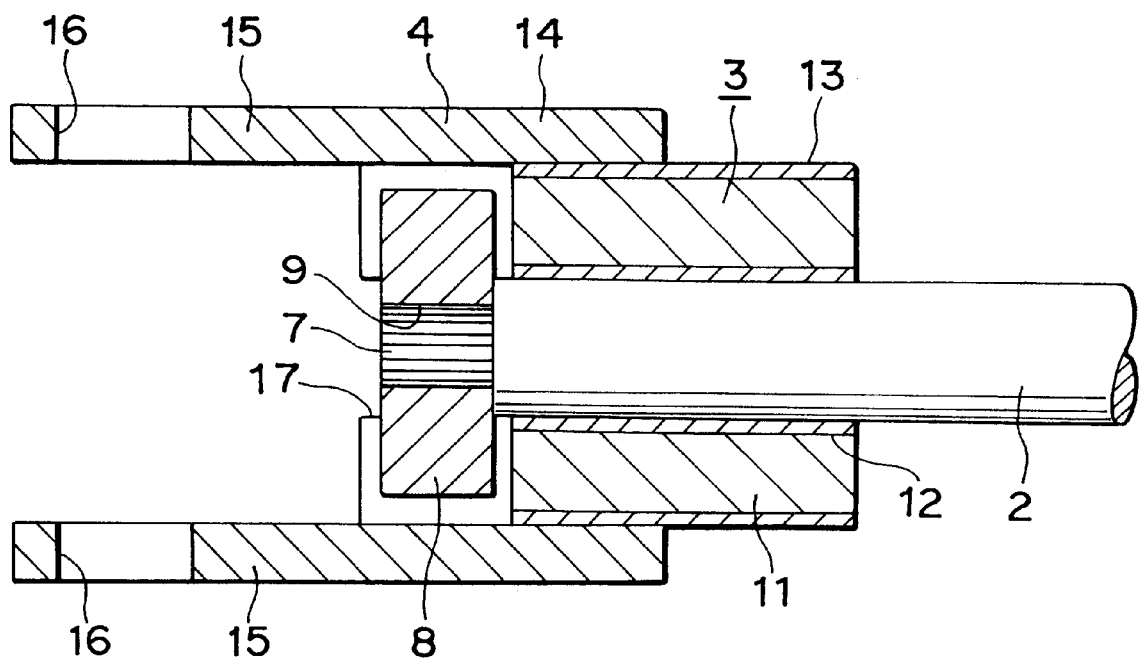
FIG. 20 is a sectional view taken substantially along the line K—K in FIG. 19 with omissions of illustrations of a joint cross and a second yoke.
Figure 21:
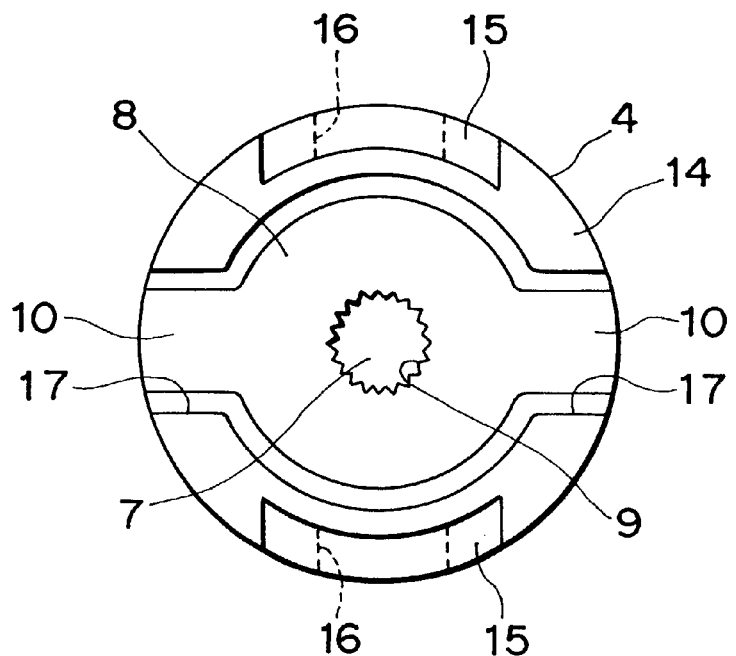
FIG. 21 is a view as viewed from leftward in FIG. 20.

FIGS. 16–18 show a sixth embodiment of the present invention. The sixth embodiment is different from the first embodiment in terms of a construction of the slide sleeve 29 of the elastic shaft joint 23. Other configurations and operations are the same as those in the first embodiment, and hence the detailed explanation is omitted. The sixth embodiment will hereinafter be discussed with a major explanatory emphasis on the construction of the slide sleeve 29.

The pair of sleeve elements 35, 35 constituting the slide sleeve 29 take the single-layered structure of, e.g., the metal in the first embodiment. In accordance with the sixth embodiment, however, each of the pair of sleeve elements 35, 35 defined as a substantially semi-cylindrical sleeve half-body is constructed preferably of metallic sleeve elements 35a, 35a, and low-friction material layers 35b, 35b provided on the inner surfaces thereof. The low-friction material layers 35b, 35b are formed by coating the inner surfaces of the metallic sleeve elements 35a, 35a with a low-friction material exhibiting a good lubricity such as fluororesin, molybdenum disulfide etc or by baking or bonding a similar low-friction material thin film or sheet.

In accordance with the sixth embodiment, the shaft 22 comes into contact with the metallic sleeve elements through the low-friction material layers 35b, 35b exhibiting the good lubricity, and therefore the slide characteristic of the sleeve 29 and the durability of the elastic shaft joint 23 are enhanced.

Generally, the resinous slide sleeve is required to have a heat resistance when molded by vulcanization integrally with, e.g., a rubber elastic member, and is therefore limited in terms of usable materials thereof. In the case of the sixth embodiment, however, a degree of freedom for selecting the materials increases.

Further, in the sixth embodiment, the slide sleeve is made of the metal, and there is adopted the low-friction material layer of fluororesin or molybdenum disulfide, in which case there is no problem such as a deteriorated performance of the low-friction material layer when making the elastic member integral with the slide sleeve by vulcanization-molding because of the low-friction material layer having a higher baking temperature than a vulcanization-molding temperature for fixing the slide sleeve 29 to the elastic member 28 such as, e.g., rubber.

The elastic shaft joint according to the present invention constructed and operative as described above can be manufactured at a relatively low cost. Futher, the elastic shaft joint ensures the sufficient durability and has a practical structure capable of absorbing a large displacement caused in the axial direction.

What is claimed is:

1. An elastic shaft joint for connecting an end portion of a rotary shaft to a cylindrical member rotatable with said shaft, said joint comprising:
   a holding cylinder fixed to said cylindrical member;
   an elastic member fixed to an inner peripheral surface of said holding cylinder;
   a slide sleeve fixed to an inner peripheral surface of said elastic member and having an inner peripheral surface of low-friction material elastically pressed against an outer peripheral surface of said shaft by elasticity of said elastic member; and
   a stopper mechanism cooperating between said shaft and said cylindrical member so as to permit said shaft and said cylindrical member to slightly displace rotationally relative to each other, while preventing such displacement in excess of a predetermined angle;
   said slide sleeve being mounted to said shaft so as to provide a full-time slidable connection of said slide sleeve to said shaft via said inner peripheral slide sleeve surface of low-friction material and said outer peripheral surface of said shaft, said slidable connection permitting relative sliding movement between said sleeve and said shaft along an axis of said shaft in order to absorb displacements along said axis.

2. The elastic shaft joint according to claim 1, wherein said slide sleeve includes of a pair of semi-cylindrical sleeve elements integrally held on the inner peripheral surface of said elastic member and a low-friction material layer fixedly provided on an inner periphery of each of said sleeve elements and exhibiting lubricity.

3. The elastic shaft joint according to claim 2, wherein each sleeve element is made of metal.

4. The elastic shaft joint according to claim 3, wherein said low-friction material layer is composed of fluororesin or molybdenum disulfide.

5. The elastic shaft joint according to claim 2, wherein said low-friction material layer is composed of fluororesin or molybdenum disulfide.

6. An elastic shaft joint for connecting an end portion of a rotary shaft to a cylindrical member rotatable with said shaft, said joint comprising:
   a holding cylinder fixed to said cylindrical member;
   an elastic member fixed to an inner peripheral surface of said holding cylinder;
   a slide sleeve fixed to an inner peripheral surface of said elastic member and having an inner peripheral portion with a non-circular cross-section, at least a part of the inner peripheral portion of said slide sleeve being formed of a low-friction material;
   an end portion of said shaft having an outer peripheral portion which is non-circular in cross-section corresponding to said inner peripheral portion of said slide sleeve, and with which said inner peripheral portion of said slide sleeve is at least partly in pressure contact due to elasticity of said elastic member;
   said slide sleeve being mounted to said shaft so as to provide a full-time slidable connection of said slide sleeve to said shaft via said low-friction material of said slide sleeve and said outer peripheral portion of said shaft, said slidable connection permitting rotation of said shaft to be transmitted to said cylindrical member through said elastic member by face-to-face engagement of said outer peripheral portion of said shaft and said inner peripheral portion of said slide sleeve and permitting relative sliding movement between said sleeve and said shaft along an axis of said shaft in order to absorb displacements along said axis; and
   a stopper mechanism cooperating between said shaft and said cylindrical member so as to permit said shaft and said cylindrical member to slightly displace rotationally relative to each other, while preventing such displacement in excess of a predetermined angle.

7. The elastic shaft joint according to claim 6, wherein said holding cylinder, said elastic member, and said slide sleeve compose an assembly unit.

8. The elastic shaft joint according to claim 6, wherein said holding cylinder is fixedly press-fitted on said cylindrical member.

9. The elastic shaft joint according to claim 6, wherein said slide sleeve includes a pair of semi-cylindrical sleeve elements integrally held on the inner peripheral surface of said elastic member and opposed to each other with a circumferential gap therebetween.

10. The elastic shaft joint according to claim 9, wherein each said sleeve element is made from metal having a low-friction material layer at an inner periphery thereof.

11. The elastic shaft joint according to claim 6, wherein said slide sleeve is formed from a low-friction synthetic resin.

12. The elastic shaft joint according to claim 6, wherein said stopper mechanism comprises a non-circular cross-sectional inner peripheral portion of said cylindrical member and a non-circular cross-sectional outer peripheral portion of said shaft opposed to each other with a gap therebetween, and allowing relative movement of said shaft and said cylindrical member along said axis of said shaft.

13. The elastic shaft joint according to claim 6, wherein said low-friction material is composed of fluororesin or molybdenum disulfide.

14. The elastic shaft joint according to claim 1, wherein said holding cylinder, said elastic member, and said slide sleeve compose an assembly unit.

15. The elastic shaft joint according to claim 1, wherein said holding cylinder is fixedly press-fitted on said cylindrical member.

16. The elastic shaft joint according to claim 1, wherein said slide sleeve includes a pair of semi-cylindrical sleeve elements integrally held on the inner peripheral surface of said elastic member and opposed to each other with a circumferential gap therebetween.

17. The elastic shaft joint according to claim 16, wherein each said sleeve element is made from metal having a low-friction material layer at an inner periphery thereof.

18. The elastic shaft joint according to claim 1, wherein said slide sleeve is formed from a low-friction synthetic resin.

19. The elastic shaft joint according to claim 1, wherein said stopper mechanism comprises a non-circular cross-sectional inner peripheral portion of said cylindrical member and a non-circular cross-sectional outer peripheral portion of said shaft opposed to each other with a gap therebetween, and allowing relative movement of said shaft and said cylindrical member along said axis of said shaft.

20. The elastic shaft joint according to claim 1, wherein said low-friction material is composed of fluororesin or molybdenum disulfide.

* * * * *